United States Patent [19]

Park

[11] Patent Number: 4,686,444
[45] Date of Patent: Aug. 11, 1987

[54] BATTERY CHARGING CIRCUIT

[75] Inventor: Beom C. Park, Seoul, Rep. of Korea

[73] Assignee: Samsung Electronics Co., Ltd., Suwon, Rep. of Korea

[21] Appl. No.: 798,590

[22] Filed: Nov. 15, 1985

[30] Foreign Application Priority Data

Nov. 21, 1984 [KR] Rep. of Korea ............... 1984-11849
Nov. 21, 1984 [KR] Rep. of Korea ............... 1984-11851

[51] Int. Cl.$^4$ ............................................. H02J 7/10
[52] U.S. Cl. ........................................ 320/31; 320/35
[58] Field of Search ........................... 320/31, 35, 36

[56] References Cited

U.S. PATENT DOCUMENTS 4,031,450  6/1977  Hammel et al. ............... 320/39 X
4,240,022 12/1980  Kilinskis ...................... 320/35 X
4,528,492  7/1985  Inaniwa ........................ 320/36
4,560,915 12/1985  Soultanian ..................... 320/35
4,602,204  7/1986  Hase ........................... 320/35 X Primary Examiner—R. J. Hickey
Attorney, Agent, or Firm—Oblon, Fisher, Spivak, McClelland & Maier

[57] ABSTRACT

A battery charging circuit, which can charge storage batteries upto the required voltage level, and prevent them from being overcharged by use of a thyristor, a temperature sensor and a current regulation means. The circuit uses a regulated switched B+ supply which is controlled by a transistor which is switched on and off by control of the thyristor. The circuit of the present invention consequently can protect not only the storage batteries themselves, but also the electronic circuits and instruments, which use the storage batteries as their power sources, from being damaged due to overcharging.

2 Claims, 3 Drawing Figures

BATTERY CHARGING CIRCUIT

FIELD OF THE INVENTION

The present invention relates to a battery charging circuit, and more particularly to a circuit which can control the charging state of quick charge storage battery by using a thyristor and a temperature sensor.

BACKGROUND OF THE INVENTION

Many kinds of quick charge batteries such as Ni-Cd battery which belongs to alkaline batteries, have been introduced. Because such batteries need relatively short charge time, they are suitable to be used as power sources of electronic instruments and lots of battery charging circuits, which can charge such batteries very quickly, have been adopted. However, these batteries are apt to be overcharged because most of the conventional charging circuits lack the protecting means which can prevent the batteries from being overcharged. Furthermore, the batteries overcharged as such can destroy the circuits and instruments for which they are used as the power sources.

SUMMARY OF THE INVENTION

It is the object of this invention to get rid of such defects which the usual charging circuits have.

In accordance with the object of the present invention, there is provided a system for automatically cutting out the supply of electric power to the charging circuit in order to prevent the battery from being overcharged when the battery is fully charged. By the present invention, the batteries will be prevented from destroying the circuits and instruments.

BRIEF DESCRIPTION OF THE DRAWINGS

The present invention will be described in detail with reference to the accompanying drawings, in which.

DETAILED DESCRIPTION OF THE PREFERRED EMBODIMENT

Figure 1:
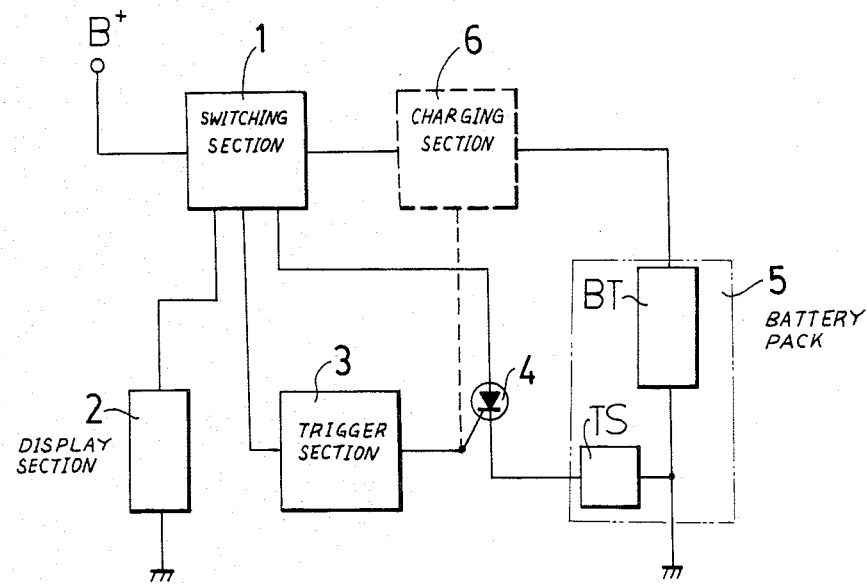
FIG. 1 is a block diagram which shows the constitution of the present invention.

The control circuit of the present invention comprises a trigger section 3 which triggers a thyristor 4 by the B+ power supply when the battery charging begins; a switching section 1 which operates when the ON state thyristor 4 and a temperature sensor TS placed in the battery pack 5 make a closed circuit; a display section 2 which shows whether the battery is charged while the switching section 1 operates; and charging section 6 which supplies B+ power from the switching section 1 to the battery BT.

According to the present invention, the battery charging is controlled as follows.

When a discharged battery, which is contained in the battery pack 5, is connected to the circuit of the present invention and the B+ power supply is applied, the trigger section 3 is driven and sends the trigger signal to the gate terminal of the thyristor 4 to turn on the thyristor 4.

The ON state temperature sensor TS in the battery pack 5 and the thyristor 4 make a closed circuit and thereby the switching section 1 is driven.

The B+ power supply from the switching section 1 is, directly through the charging section 6, applied to the battery BT in the battery pack 5 and thereby the battery BT is charged. When charging of the battery BT is almost completed, the temperature sensor TS is in an OFF state because of the generation of heat in the battery BT. The thyristor 4 is turned off because the temperature sensor TS cuts out the ground. As the operation of the switching section 1 is stopped as above, the charging power is not supplied and the battery BT is prevented from being overcharged.

Figure 2:
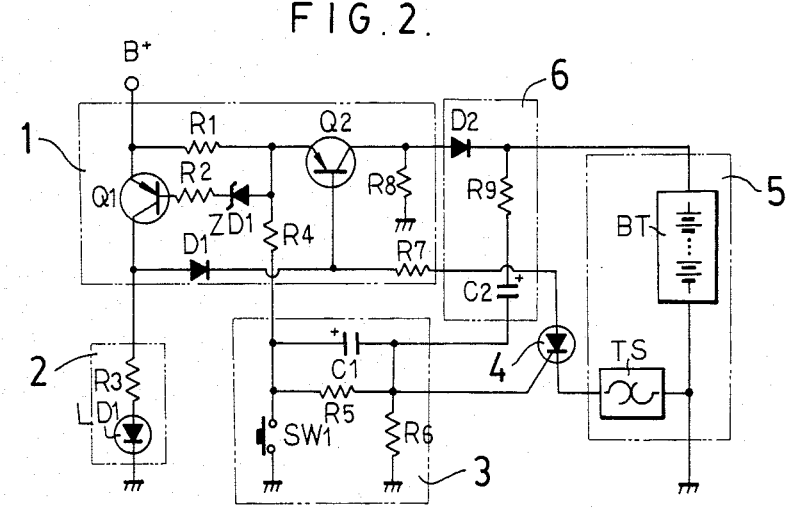
FIG. 2 is a circuit diagram of the first preferred embodiment of the present invention.

FIG. 2 shows a circuit representing the first preferred embodiment of the present invention. In FIG. 2, switching section 1, which consists of Zener diode $ZD_1$ for current regulation and transistors $Q_1$ and $Q_2$, is connected to the display section 2; the output terminals of the switching section 1 are connected to the battery pack 5 equipped with the temperature sensor TS, namely a thermostat, through the charging section 6; the anode of the thyristor 4, whose cathode is connected to the temperature sensor TS, is connected to the base of the transistor $Q_2$ and the gate terminal of the thyristor 4 is connected to the trigger section 3 equipped with a charge starting switch $SW_1$ and to also the charging section 6.

In FIG. 2, $R_1 \sim R_9$ are resistors, $C_1$ and $C_2$ are triggering condensers, $D_1$ and $D_2$ are diodes, and $LD_1$ is a light emitting diode(LED).

Now, the operation of the first embodiment comprised as above is described hereunder.

The temperature sensor TS in the battery pack 5 is to be in ON state at the initial charging step, and to be in OFF state on the completion of charging because of the heat generated during the battery charging. Firstly, when B+ power supply is applied to the battery pack 5 connected as shown in FIG. 2, an instantaneous trigger pulse through the condenser $C_1$ triggers the gate of the thyristor 4 and thereby the thyristor 4 is turned on. Consequently, the base voltage of transistor $Q_2$ becomes low and the transistor $Q_2$ is turned on. When the B+ power supply is applied to the battery BT, a part of the current is charged in the condenser $C_2$ of the charging section 6.

Meanwhile, the transistor $Q_1$ in the switching section 1 is also turned on in the same manner as the aforesaid transistor $Q_2$. Zener voltage of the Zener diode $ZD_1$ can be selected according to the amount of the current required in the switching section 1 because the resistor $R_2$ and the Zener diode $ZD_1$ are elements for current limitation by detecting the voltage drop in the resistor $R_1$. That is, the sum of Zener voltage $V_{ZD1}$ of Zener diode $ZD_1$ and base voltage $V_{EB}$ of transistor $Q_1$ must be smaller than the voltage drop at the resistor $R_1$. If the voltage drop at the resistor $R_1$ is smaller than the aforesaid sum on the contrary, the Zener diode $ZD_1$ can be omitted from the circuit.

The diode $D_1$ is to prevent the transistor $Q_2$ from being turned ON through the resistor $R_3$ and LED $LD_1$. As the transistor $Q_1$ is turned on, LED $LD_1$ is also turned on and indicates the battery is being charged.

If the thyristor 4 is not triggered due to a noise component of B+ power supply to the condenser $C_1$ at the initial stage of charging operation, the charge starting switch $SW_1$ has manually to be touched in a moment to trigger the thyristor 4. In this case, the triggering power is supplied from the condenser $C_1$ charged by B+ power source.

As the charging of the battery BT is nearly completed, the battery BT emits relatively high heat and the contact of the temperature sensor TS is disconnected or released at the influence of thermal conduction.

As the base of the transistor $Q_2$ is deprived of the earth or ground, the transistors $Q_2$ and $Q_1$ are turned off and B+ electric power to charge the battery BT is cut off.

The switching section 1 in FIG. 2 can also function as a current regulator. If the value of the electric current increases while B+ electric power is applied to the battery BT through the resistor $R_1$ and the transistor $Q_2$, the voltage drop at the resistor $R_1$ grows up. The anode voltage of Zener diode $ZD_1$ becomes relatively low in comparison to the emitter voltage of transistor $Q_1$.

The base current of the transistor $Q_1$ is caused to increase by this voltage difference, resulting in increase of the collector current of the transistor $Q_1$.

As the collector current of the transistor $Q_1$ flows through the diode $D_1$ and the resistor $R_7$, the increase of the collector current makes big voltage drop at the resistor $R_7$. Because of these phenomena, the base voltage of the transistor $Q_2$ becomes high and the base current of the transistor $Q_2$ is decreased, resulting in decrease of the collector current flowing to the battery BT.

On the contrary, if the current, which flows to the battery BT through the resistor $R_1$, decreases, the voltage drop at the resistor $R_1$ is decreased and consequently the voltage difference between the emitter and the base of the transistor $Q_2$ is raised, resulting in increase of its collector current.

Through the repetition of this procedure, the current which flows to the battery BT can be kept almost constant.

After the battery BT is charged, it can be used as a power source of various electronic circuits and instruments after being removed together with the battery pack 5.

When the battery BT is almost discharged, recharging of it is made as follows; As the battery pack 5 is connected to the circuit of the present invention, an instantaneous trigger pulse, produced by the residual current in the battery BT, is given to the gate of the thyristor 4 through the condenser $C_2$. As the thyristor 4 is turned on, recharging of the battery BT is achieved in the same way as the charging process described above.

If the battery BT is thoroughly discharged and so no residual current exists at the initial charging stage, the thyristor 4 shall be manually triggered by turning on the charge starting switch $SW_1$.

Figure 3:
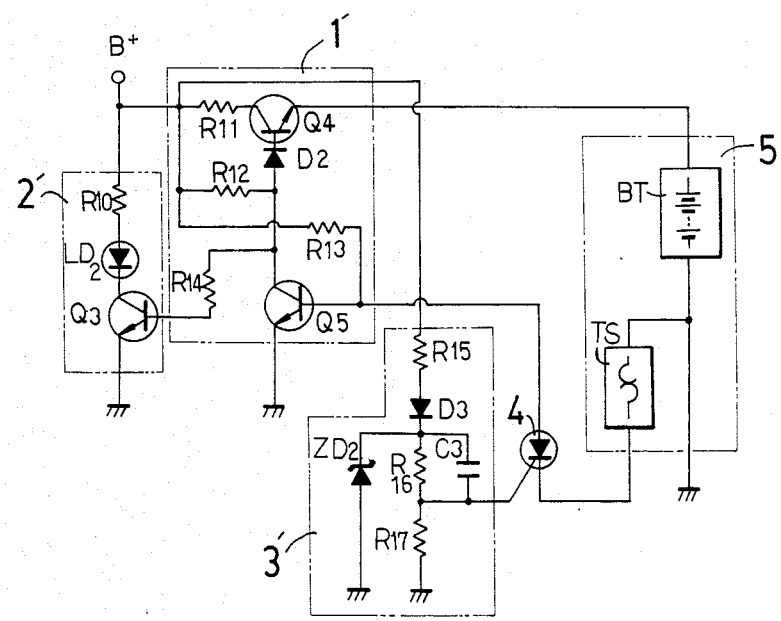
FIG. 3 is a circuit diagram of the second preferred embodiment of the present invention.

FIG. 3 shows a circuit of the second preferred embodiment of the present invention.

The output terminal of a switching section 1', which consists of resistors $R_{11} \sim R_{13}$, a diode $D_2$ and transistors $Q_4$ and $Q_5$, is connected to a battery pack 5 having a temperature sensor TS in it; the anode of a thyristor 4 whose cathode is connected to the temperature sensor TS is connected to the base of the transistor $Q_5$; the gate of the thyristor 4 is connected to the trigger section 3' which comprises resistors $R_{15} \sim R_{17}$, a diode $D_3$, a Zener diode $ZD_2$ and a condenser $C_3$; the collector of the transistor $Q_5$ is connected to a display section 2' which has a transistor $Q_3$ and a LED $LD_2$. $R_{10}$ and $R_{14}$ are resistors.

The operation of the circuit of the second preferred embodiment comprised as above is described hereunder. When the battery pack 5 is connected as shown in FIG. 3, B+ electric power is divided by the resistor $R_{12}$ and then supplied to the base of the transistor $Q_4$. Consequently, the transistor $Q_4$ is turned on and the divided B+ electric power is supplied to the battery BT to charge it.

Meanwhile, B+ electric power is also supplied to the registor $R_{15}$ and the diode $D_3$ in the trigger section 3' through the registor $R_{13}$ and a trigger pulse, made by a combination of the bias registors $R_{10}$ and $R_{17}$, the Zener diode $ZD_2$ and the condenser $C_3$, is given to the gate of the thyristor 4 turned on.

Consequently, B+ electric power which flows through the resistor $R_{13}$ is by-passed to the ground through the ON state thyristor 4 and the temperature sensor TS, the transistor $Q_5$ is turned off.

Meanwhile, each of the transistors $Q_3$ and $Q_4$ is turned on by B+ power supply through the resistor $R_{12}$ and $R_{14}$ and the battery BT begins to be charged. At the same time, the LED $LD_2$ is turned on by B+ electric power supply through the resistor $R_{10}$ and indicates that the battery is being charged.

As the charging operation as described above has been completed, the thyristor 4 is turned off because the contact of the temperature sensor TS is disconnected at the influence of the heat in the battery BT.

When the thyristor 4 is turned off, the base voltage of the transistor $Q_5$ is changed to high level and so the transistor $Q_5$ is turned on. As the transistor $Q_5$ is turned on, the transistors $Q_4$ and $Q_3$ are turned off with the consequence that the charging of the battery BT is stopped and the LED $LD_2$ is turned off, indicating that the charging is finished. The diode $D_2$ is to protect the transistor $Q_4$ from being damaged due to a reverse voltage to be generated across the base and emitter of the transistor $Q_4$ upon completion of charging.

While there has been illustrated and described what is considered at present to be preferred embodiment of the present invention, it is apparent that the present invention provides the advantages to protect the storage batteries themselves and also the electronic circuits and instruments which use the storage batteries as their power sources because the batteries are prevented from being overcharged.

I claim:

1. A circuit for charging a battery comprising:
    a power supply means for connection to a B+ power supply;
    an input switching section coupled to said power supply means comprising:
    a first transistor coupled to said power supply means;
    a zener diode coupled to said first transistor for providing a means for regulation of voltage;
    a second transistor having its emitter coupled to said zener diode;
    wherein said input switching section supplies means to regulate said B+ power in response to the presence of a voltage at the base of said second transistor;
    a means for sensing the temperature of said charging battery;
    a thyristor coupled to said second transistor in said input switching section and which is conductive in response to the presence of a base voltage of said second transistor and the sensed temperature of said battery for controlling the operation of said second transistor in accordance with a sensed temperature of the battery to be charged.

2. A circuit for charging a as in claim 1 further comprising:
    a display section for showing whether said battery is charging.

* * * * *